United States Patent
Selby

(10) Patent No.: US 8,611,883 B2
(45) Date of Patent: *Dec. 17, 2013

(54) PRE-RECORDED VOICE RESPONSES FOR PORTABLE COMMUNICATION DEVICES

(75) Inventor: Michael L. Selby, Carrollton, TX (US)

(73) Assignee: Verizon Online LLC, Ashburn, VA (US)

( * ) Notice: Subject to any disclaimer, the term of this patent is extended or adjusted under 35 U.S.C. 154(b) by 25 days.

This patent is subject to a terminal disclaimer.

(21) Appl. No.: 13/174,057

(22) Filed: Jun. 30, 2011

(65) Prior Publication Data

US 2011/0263228 A1 Oct. 27, 2011

Related U.S. Application Data

(63) Continuation of application No. 12/104,677, filed on Apr. 17, 2008, now Pat. No. 7,991,391.

(51) Int. Cl.
*H04M 3/00* (2006.01)

(52) U.S. Cl.
USPC ....... 455/418; 455/413; 455/419; 379/202.01

(58) Field of Classification Search
USPC ............ 455/418, 413, 419; 379/202.01, 67.1
See application file for complete search history.

(56) References Cited

U.S. PATENT DOCUMENTS

| | | | | |
|---|---|---|---|---|
| 5,442,685 | A * | 8/1995 | Sakata et al. | 379/67.1 |
| 6,243,594 | B1 * | 6/2001 | Silberfenig | 455/556.1 |
| 7,769,364 | B2 * | 8/2010 | Logan et al. | 455/413 |
| 2002/0128000 | A1 | 9/2002 | Do Nascimento, Jr. | |
| 2005/0065791 | A1 | 3/2005 | Kim | |
| 2006/0099988 | A1 * | 5/2006 | Velagaleti et al. | 455/552.1 |
| 2007/0206760 | A1 * | 9/2007 | Bandhole et al. | 379/202.01 |
| 2009/0275362 | A1 * | 11/2009 | Tieman et al. | 455/556.1 |

* cited by examiner

*Primary Examiner* — Danh Le

(57) ABSTRACT

A portable communication device may be used so that, in place of speaking into the portable communication device during a telephone call, users may initiate playback of pre-recorded messages to the party with whom the user is communicating. In one implementation, a device may receive, during a telephone call between a first party and a second party, a command from the first party to transmit a pre-recorded message to the second party. The pre-recorded message may be an audible message that was pre-recorded by the first party. The device may transmit the pre-recorded message to the second party in response to the command.

20 Claims, 7 Drawing Sheets

US 8,611,883 B2

PRE-RECORDED VOICE RESPONSES FOR PORTABLE COMMUNICATION DEVICES

RELATED APPLICATION

This application is a continuation of U.S. patent application Ser. No. 12/104,677, filed Apr. 17, 2008, which is incorporated herein by reference.

BACKGROUND INFORMATION

In an increasingly digitally connected world, telecommunication services play a crucial role in the daily operation of businesses and consumers. Telecommunication services commonly used by both businesses and consumers include telephone, network (e.g., Internet) connectivity, and television. These services are typically provided to the customer premises by the telecommunication provider through one or more wired or wireless connections.

Wireless communication connections are particularly popular and are typically provided through a number of types of portable communication devices (e.g., different types of cellular phones, smart phones, etc.). Users of portable communication devices typically carry the devices with them throughout their day-to-day activities. Occasionally, a user may be in a situation in which the user would like to use a portable communication device in an environment where it is not desirable or acceptable to audibly speak into the device. For example, the user may be in a library, a classroom, or other location where talking is discouraged. In such situations, a user may still communicate by typing or keying text messages into their portable communication device ("texting" or "text messaging"). Text messaging, however, can be cumbersome and potentially impersonal.

DETAILED DESCRIPTION OF PREFERRED EMBODIMENTS

The following detailed description of exemplary implementations refers to the accompanying drawings. The same reference numbers in different drawings may identify the same or similar elements. Also, the following detailed description does not limit the invention.

As described herein, users may, instead of speaking into a portable communication device, control the portable communication device to playback pre-recorded messages to the party with whom the user is communicating. The pre-recorded messages may either be "canned" messages provided by another party (e.g., the telephone service provider) or custom messages that were previously recorded by the user. A user can thus carry on a limited audible conversation with the other party without actually speaking into the user's portable communication device.

Figure 1:
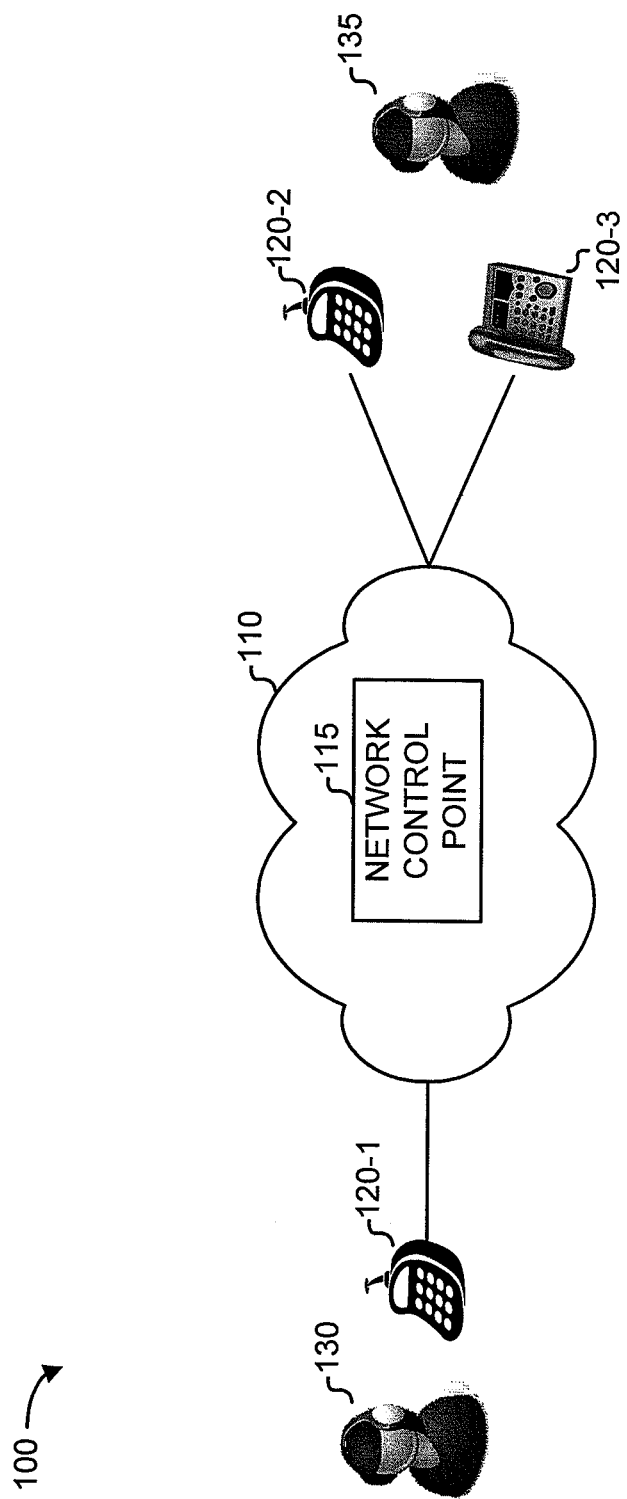
FIG. 1 is a diagram illustrating an exemplary system in which concepts described herein may be implemented.

FIG. 1 is a diagram illustrating an exemplary system 100 in which concepts described herein may be implemented. As shown, system 100 includes a network 110 and three client devices 120-1 through 120-3 (collectively, client devices 120). Client devices 120 may be communication devices, such as fixed landline telephones (e.g., client device 120-3), portable communication devices (e.g., client devices 120-1 and 120-2), or other types of communication devices. Users 130 and 135 may be associated with and use respective client devices 120 to communicate over network 110.

Network 110 may generally include one or more networks that provide telephony or data services to client devices 120. Network 110 may include one or more networks of any type, including a Public Land Mobile Network (PLMN), a Public Switched Telephone Network (PSTN), a cellular network, a VoIP network, a metropolitan area network (MAN), a wide area network (WAN), a local area network (LAN), a private network, the Internet, an intranet, another type of network and/or a combination of networks. Network 110 may particularly represent a number of different types of networks, such as a cellular network, a PSTN, and a wide area data network (e.g., the Internet). In this situation, network 110 may also include gateway devices that provide interfaces between different network types.

Network 110 may include network devices that provide control points for telephony or data services through network 110. An exemplary network control point 115 is shown within network 110. Network control point 115 may be, for example, one or more network devices that participate in establishing and maintaining communication sessions between users, such as users 130 and 135.

Client devices 120 may include one or more devices that provide an interface through which users can communicate with other clients. Client devices 120 may include mobile telephones, personal computers, laptops, personal digital assistants, telephone devices, television set-top boxes, and/or other types of communication devices. Client devices 120 may connect to network 110 via wired and/or wireless connections.

The number of networks 110, client devices 120, or network control points 115 illustrated in FIG. 1 is provided for simplicity. In practice, there may be more networks 110, client devices 120, or network control points 115.

Figure 2:
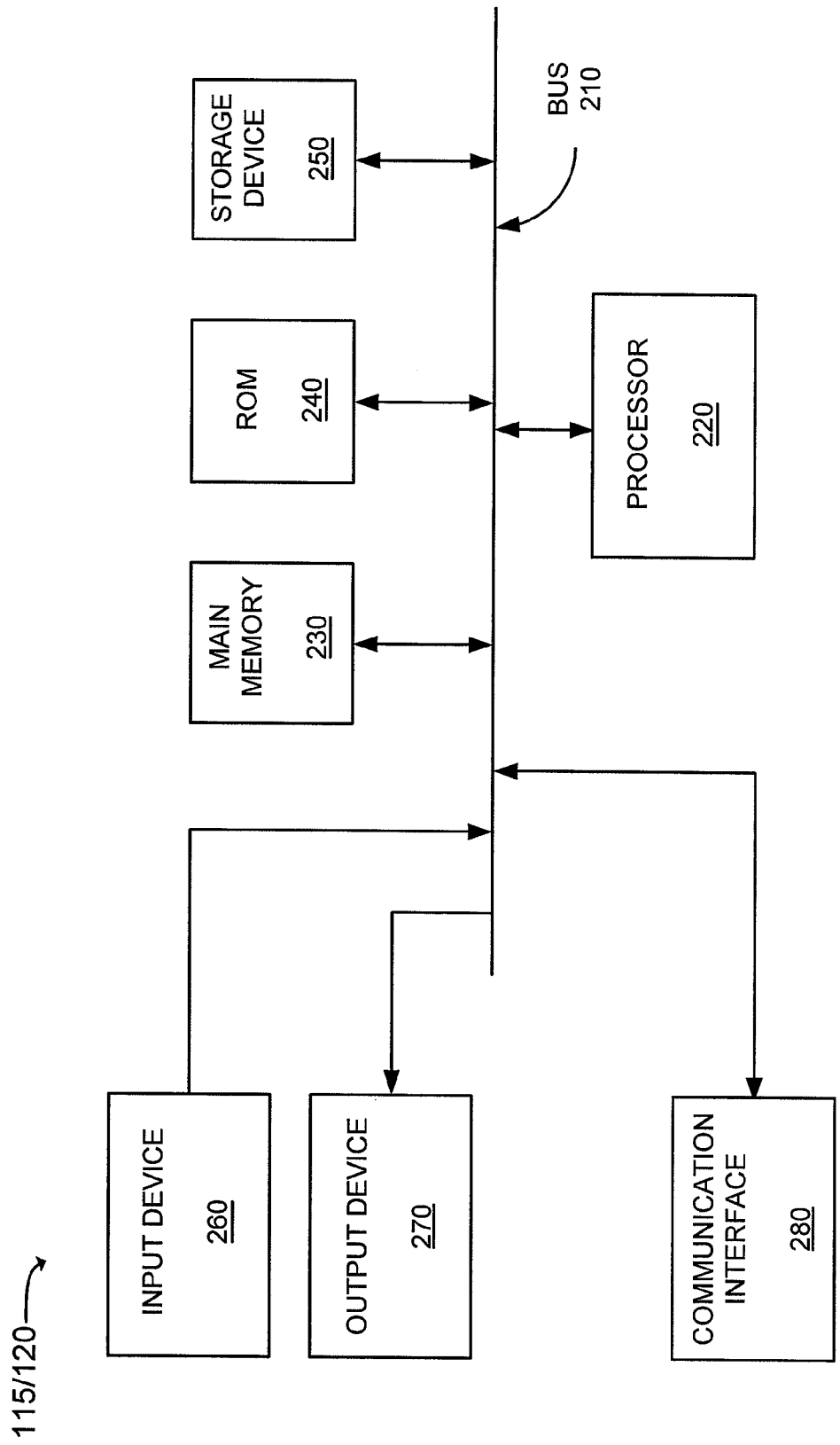
FIG. 2 is a diagram of an exemplary device that may represent a client device or a network control point shown in FIG. 1.

FIG. 2 is a diagram of an exemplary device that may represent a client device 120 or a network control point 115. Device 115/120 may include a bus 210, a processor 220, a main memory 230, a read only memory (ROM) 240, a storage device 250, an input device 260, an output device 270, and a communication interface 280. Bus 210 may include conductors or a pathway that permit communication among the components of client/server 120/130.

Processor 220 may include a processor(s), a microprocessor(s), or processing logic that interprets and executes instructions. Main memory 230 may include a random access memory (RAM) or another type of dynamic storage device that stores information and instructions for execution by processor 220. ROM 240 may include a ROM device or another type of static storage device that stores static information and instructions for use by processor 220. Storage device 250 may include a magnetic and/or optical recording medium and its corresponding drive.

Input device 260 may include one or more mechanisms that permit a user to input information to device 115/120, such as a keyboard, a mouse, a pen, voice recognition and/or biometric mechanisms, etc. Output device 270 may include one or more mechanisms that output information to the user, including a display, a printer, a speaker, etc. Communication interface 280 may include any transceiver-like mechanism that enables device 115/120 to communicate with other devices and/or systems. For example, communication interface 280 may include mechanisms for communicating with another device or system via a network, such as network 110.

As will be described in detail below, client devices 120 and or network control point 115 may implement functions relating to playback of pre-recorded voice messages during a communication session. Software implementing these functions may be stored in a computer-readable medium, such as memory 230, in a client device 120 and/or in network control point 115. A computer-readable medium may be defined as one or more physical or logical memory devices.

The software instructions defining the operations of client device 120 and/or network control point 115 may be read into memory 230 from another computer-readable medium, such as data storage device 250, or from another device via communication interface 280. The software instructions contained in memory 230 may cause processor 220 to perform processes that will be described later. Alternatively, hardwired circuitry or other logic may be used in place of, or in combination with, software instructions to implement processes described herein. Thus, embodiments described herein are not limited to any specific combination of hardware circuitry and software.

The playback of pre-recorded voice messages during a communication session, as will be described below, may be particularly relevant to user's of portable communication devices, such as client devices 120-1 and 120-2.

Figure 3:
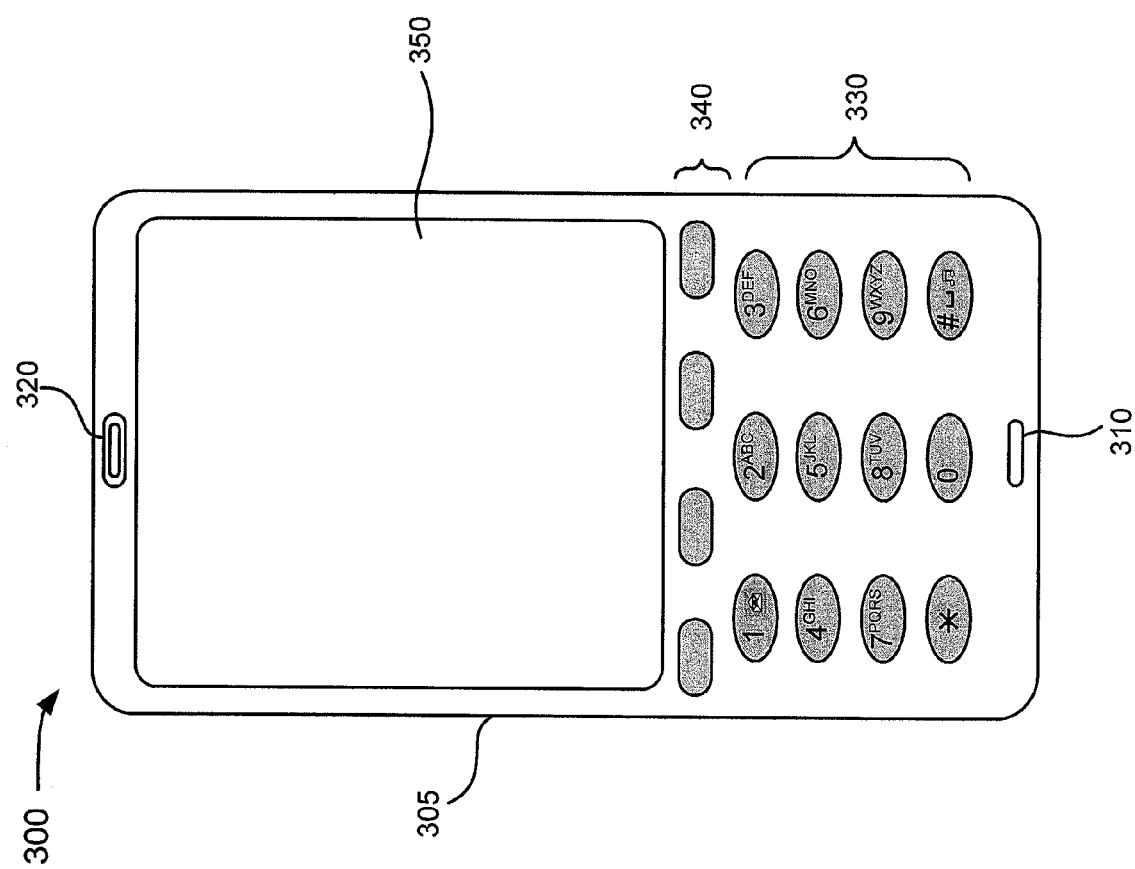
FIG. 3 is a diagram illustrating an exemplary portable communication device.

FIG. 3 is a diagram illustrating an exemplary portable communication device 300. Portable communication device 300 may, for instance, correspond to portable communication device 120-1 and 120-2 in FIG. 1.

As illustrated, device 300 may include a housing 305, a microphone 310, a speaker 320, a keypad 330, function keys 340, and a display 350.

Housing 305 may include a structure configured to contain components of device 300. For example, housing 305 may be formed from plastic and may be configured to support microphone 310, speaker 320, keypad 330, function keys 340, and display 350.

Microphone 310 may include any component capable of transducing air pressure waves to a corresponding electrical signal. For example, a user may speak into microphone 310 during a telephone call. Speaker 320 may include any component capable of transducing an electrical signal to a corresponding sound wave. For example, a user may listen to music from speaker 320.

Keypad 330 may include any component capable of providing input to device 300. Keypad 330 may include a standard telephone keypad. Keypad 330 may also include one or more special purpose keys. In one implementation, each key of keypad 330 may be, for example, a pushbutton. A user may utilize keypad 330 for entering information, such as text or a phone number, or activating a special function.

Function keys 340 may include any component capable of providing input to device 300. Function keys 340 may include a key that permits a user to cause device 300 to perform one or more operations. The functionality associated with a key of function keys 340 may change depending on the mode of device 300. For example, function keys 340 may perform a variety of operations, such as placing a telephone call, playing various media, or accessing an application. Function keys 340 may include a key that provides a cursor function and a select function. In one implementation, each key of function keys 340 may be, for example, a pushbutton.

Display 350 may include any component capable of providing visual information. For example, in one implementation, display 350 may be a liquid crystal display (LCD). In another implementation, display 350 may be any one of other display technologies, such as a plasma display panel (PDP), a field emission display (FED), a thin film transistor (TFT) display, etc. Display 350 may display, for example, text, image, and/or video information.

Figure 4:
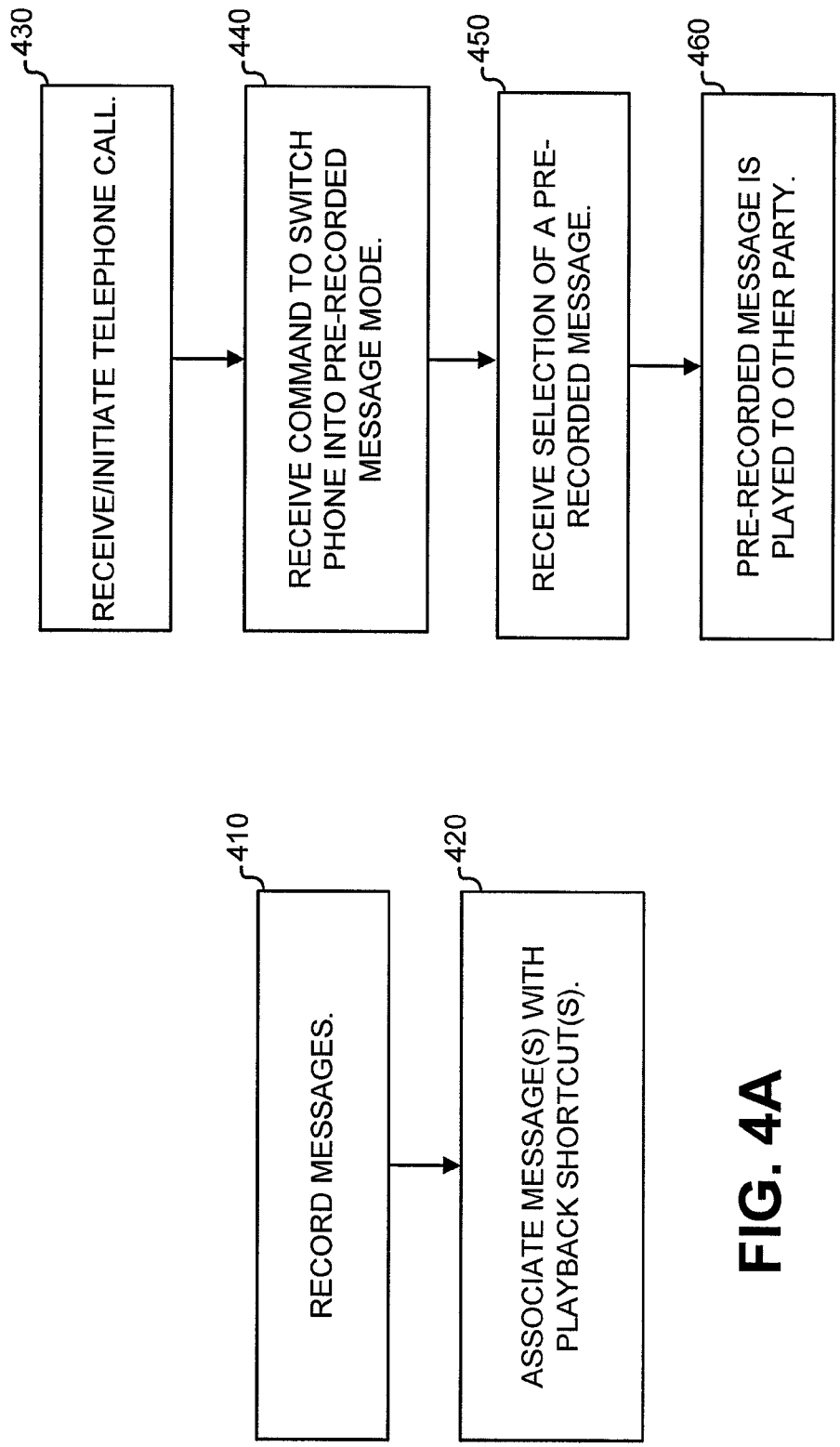
FIG. 4A is a flowchart illustrating exemplary operations for configuring a system to be able to play pre-recorded messages.
FIG. 4B is a flowchart illustrating exemplary operations for conducting a communication session with a portable communication device using pre-recorded messages.

FIGS. 4A and 4B are flowcharts illustrating exemplary operations for the playback of pre-recorded voice messages during a communication session.

Before messages can be played back during a communication session, the messages may be recorded or otherwise defined. FIG. 4A is a flowchart illustrating exemplary operations for configuring a system to be able to play pre-recorded messages.

A user of a communication device, such as portable communication device 120-1, may record messages that the user believes may be useful in a future conversation (block 410). For example, the user may record messages such as "yes," "no," and "I will get back to you about that." In some implementations, a certain set of messages may be pre-recorded (in a standard voice) for the user by the telecommunication provider. Nevertheless, the user may choose to re-record these messages so that they will be messages in the user's voice.

In some implementations, the recorded messages may be stored on portable communication device 120-1. In other implementations, the recorded messages may be stored at network control point 115. Whether the recorded messages are stored on portable communication device 120-1 or at network control point 115 may depend on whether the functions described herein relating to pre-recorded message playback during a conversation are implemented by an application implemented at portable communication device 120-1 or at network control point 115. Both of these potential implementations will be described in more detail below.

Pre-recorded messages may next be associated with playback shortcut(s). For example, in some implementations, the user may associate numeric codes with different messages. Thus, 01 could be associated with "yes," 02 could be associated with "no," and 03 could be associated with "I will get back to you about that." Alternatively, possible messages could be displayed to the user via display 350 of portable communication device 120-1. In this case, the user may not need to explicitly associate the messages with shortcut keys. Additionally, possible messages could be accessed using a text auto complete function where the user enters the first one or more letters in the message via keypad 330 until the message can be unambiguously determined. For example, with the example three messages "yes," "no," and "I will get back to you about that," entering "y" would be enough to determine that the user intends to playback the message "yes." In this case also, the user may not need to explicitly associate the messages with shortcut keys.

FIG. 4B is a flowchart illustrating exemplary operations for conducting a communication session with a portable communication device using pre-recorded messages.

To begin, a portable communication device, such as device 120-1, may receive or initiate a telephone call with another party (block 430). For example, the user may dial the number of another party or the user may receive a phone call.

Portable communication device 120-1 may receive a command from the user (such as a command entered through keypad 330 or function keys 340) to place the communication session into "pre-recorded message" mode (block 440). In this mode, the user may transmit pre-recorded messages to the other party instead of speaking to the other party. This can be useful in a number of situations, such as when the user is in an environment where talking is not permitted or is inappropriate, when the user is in an environment where the background noise is too loud to allow for clear communication, or when the user has a speech impairment or otherwise has difficulty speaking.

In some implementations, placing a call into pre-recorded message mode may automatically disable microphone 310 on portable communication device 120-1. Additionally, in some implementations, placing the call into pre-recorded message mode may also trigger the immediate playback of a message to the other party informing the other party that the call has been placed into pre-recorded message mode.

Alternatively, in some implementations, switching between pre-recorded message mode and normal message mode may not require an explicit action by the user. Instead, a user may be able to, at any time during "normal" operation, be able to enter a code to play a pre-recorded message without previously having entered a command to switch the phone to pre-recorded message mode.

The user may still listen to the other party as normal. For example, the user may place portable communication device 120-1 near the user's ear as is typically done when speaking on a telephone or use a headphone extension to listen to the other party. When appropriate in the conversation, the user may use the previously defined shortcuts to trigger the playback of a pre-recorded message (block 450). The pre-recorded message may then be transmitted to the other party (block 460), thus allowing the user to participate in a natural-like conversation without actually speaking.

In some implementations, portable communication device 120-1 may allow the user to enter normal text messages in addition to the shortcuts for the pre-recorded messages. Accordingly, the user could alternate, as desired, between sending pre-recorded messages and text messages.

Switching communication modes between pre-recorded playback mode and regular (audible) communication made may also be implemented in a manner that allows the user to easily switch back and forth between modes. For example, the user may initially switch portable communication device 120-1 to pre-recorded message mode. During the conversation, however, the user may decide that the conversation is important enough that an audible response is needed. The user may then switch portable communication device 120-1 to normal mode, say what the user wants to say, and then switch portable communication device 120-1 back to pre-recorded message mode.

Additionally, in some implementations, an option may be provided for the user to, at any time, transfer the call to the user's voice mail.

A number of different possible techniques may be used to allow the user to interact with portable communication device 120-1 to select from the available messages (block 440 above). As previously discussed, the user may use keypad 330 of portable communication device 120-1 to enter codes that correspond to pre-recorded messages. Alternatively, a menu may be shown to the user.

Figure 5:
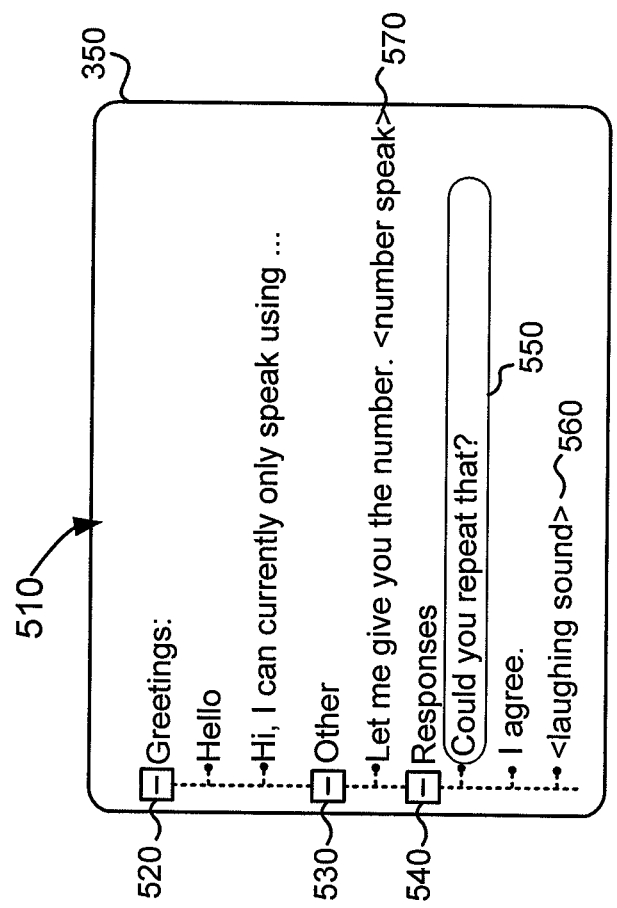
FIG. 5 is a diagram of an exemplary menu illustrating selection of pre-recorded messages.

FIG. 5 is a diagram of an exemplary menu illustrating selection of pre-recorded messages. Such a menu may be displayed to the user via display 350 of portable communication device 120-1.

In the example shown in FIG. 5, a hierarchical menu 510 is shown on display 350. Menu 510 is shown as including a "greetings" category 520, an "other" category 530, and a "responses" category 540. The user may be able to navigate menu 510 by, for example, using arrow keys on keypad 530 or function keys 540 of portable communication device 120-1. In this example, the currently selected message is labeled "Could you repeat that" and shown as selected via rounded rectangle 550.

In some implementations, the pre-recorded messages may, in addition to being transcribable words, may include sounds. For instance, label 560 is shown in FIG. 5 as "<laughing sound>". Selecting this message may play a laugh sound to the other party.

Additionally, some pre-recorded messages may be messages that allow for additional input from the user. For instance, label 570 is shown in FIG. 5 as "Let me give you the number. <number speak>". Selecting this message may play the message "let me give you the number" and then cause portable communication device 120-1 to enter a "number speak" mode in which subsequent numbers entered by the user through keypad 330 are audibilized and transmitted to the other party. For instance, the user may wish to communicate a telephone number to the other party, where the telephone number was not previously recorded. Selecting label 570 may allow the user to send the telephone number to the other party without requiring the user to speak or edit the pre-recorded messages. The other party may hear a message such as, "let me give you the number," followed by a series of spoken numbers.

Figure 6:
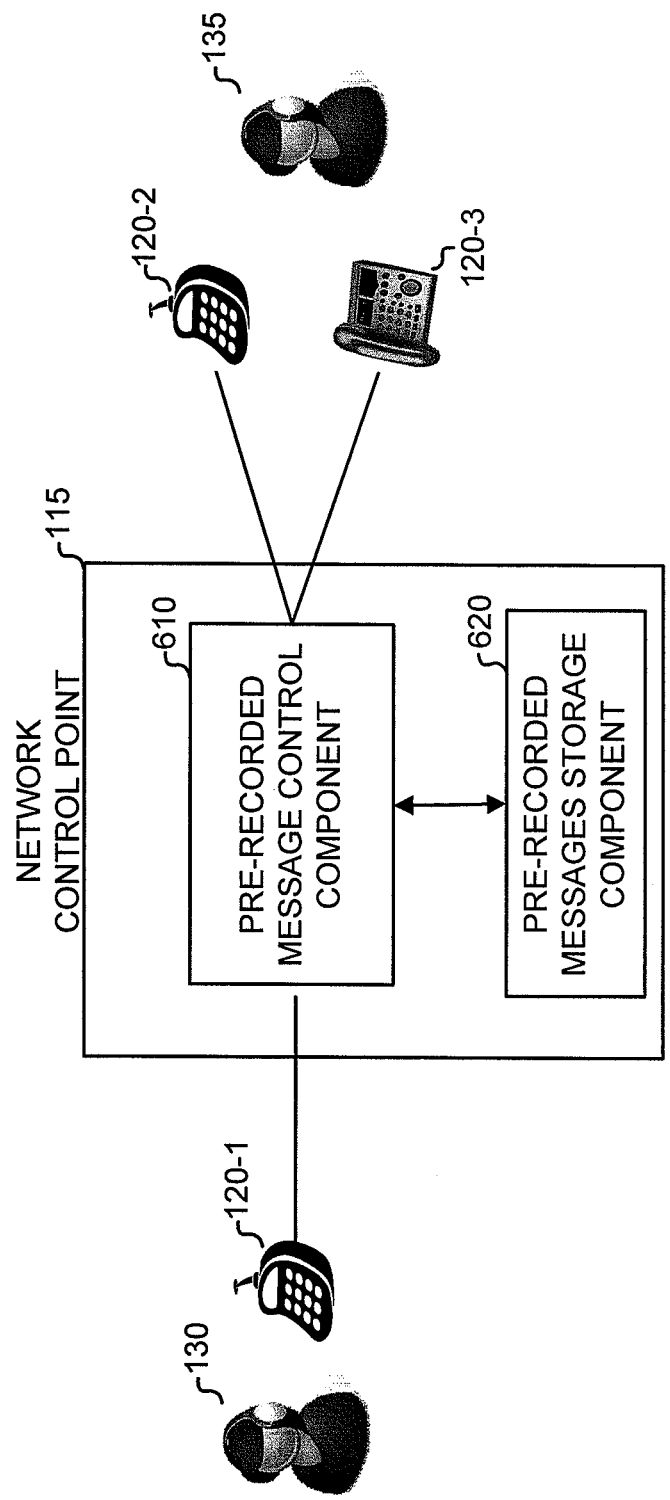
FIG. 6 is a block diagram conceptually illustrating a network-based implementation for pre-recorded message playback.

FIG. 6 is a block diagram conceptually illustrating a network-based implementation for pre-recorded message playback. FIG. 6 is similar to FIG. 1, except that in FIG. 6, network control point 115 is shown in additional detail. More specifically, network control point 115 may include a pre-recorded message control component 610 and a pre-recorded messages storage component 620. Pre-recorded message control component 610 and pre-recorded messages storage component 620 may be implemented as one or more general purpose or application-specific computing devices and corresponding software. Pre-recorded messages storage component 620 may particularly include a database or other storage technology for storing pre-recorded messages.

Network control point 115, as shown in FIG. 6, may enable a network-based implementation of the operations discussed with respect to FIGS. 4A and 4B. With a network-based implementation, pre-recorded message playback may be implemented without modifying client devices 120. In other words, client devices 120 may not need to be particularly customized or have any custom software installed.

Pre-recorded message control component 610 may generally function to monitor communication sessions that are in "pre-recorded message" mode to look for signals indicating that a pre-recorded message is to be played. When pre-recorded message control component 610 locates such a signal, it may access pre-recorded message component 620 to obtain the appropriate pre-recorded message and then forward the pre-recorded message, as an audible signal, to the other party. In other words, pre-recorded message control component 610 may function to dynamically substitute pre-recorded messages for message shortcut signals within a conversation.

In one possible implementation, dual-tone multi-frequency (DTMF) signals may be used to access a user's pre-recorded messages. During a conversation, the user may enter the correct DTMF code to trigger the desired pre-recorded message. For example, if 01 is associated with the pre-recorded message "yes," the user may simply press 01 on keypad 330 during a conversation to cause the DTMF signals corresponding to 01 to be sent to pre-recorded message control component 610. DTMF signals may also be used to control other features of pre-recorded message playback, such as whether the communication session is in pre-recorded message mode. For example, DTMF code 00 may be sent to toggle between pre-recorded message mode and normal mode.

In the network-based implementation shown in FIG. 6, the operations of blocks 410 and 420 (FIG. 4A) may be performed by the user via, for example, a dial-in interactive voice response (IVR) system that may prompt the user to record various messages and enter playback codes corresponding to the messages. The recorded messages may then be stored in pre-recorded messages storage component 620 for later playback during a conversation.

Figure 7:
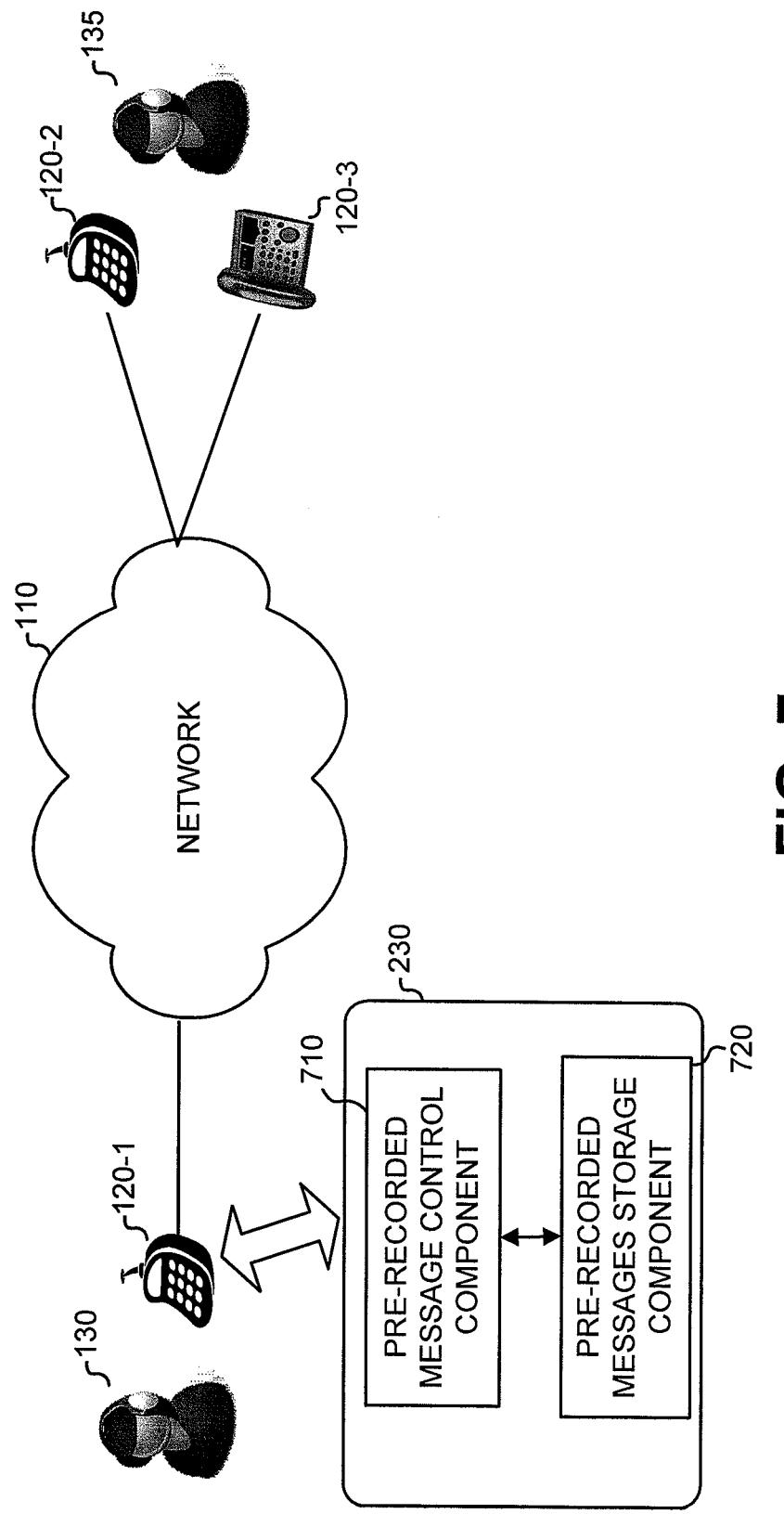
FIG. 7 is a block diagram conceptually illustrating a client-based implementation for pre-recorded message playback.

In addition to the network-based implementation, in some implementations, pre-recorded message playback may be performed as a client-side service performed on client devices 120. A client-side implementation of pre-recorded message playback may be particularly advantageous as it may allow for a higher level of control over the interface presented to the user. FIG. 7 is a block diagram conceptually illustrating a client-based implementation for pre-recorded message playback. FIG. 7 is similar to FIG. 1, however, in FIG. 7, client device 120-1 is shown in additional detail as including components to enable pre-recorded message playback.

Client device 120-1 may particularly include logic, such as a software application, that may be stored in memory 230 and that controls client device 120-1 to perform pre-recorded message playback. As shown in FIG. 7, this logic may include a pre-recorded message control component 710 and a pre-recorded messages storage component 720.

Pre-recorded message control component 710 may generally function to enable a pre-recorded message mode for client device 120-1, provide an interface to the user for receiving commands corresponding to pre-recorded messages, and transmit the pre-recorded messages to the called party when indicated by the user. For example, in response to the user pressing a predetermined key to enable pre-recorded message mode, pre-recorded message control component 710 may disable microphone 310 of client device 120-1 and begin to display a graphical menu, such as the menu shown in FIG. 5, on display 350. Through the menu, pre-recorded message control component 710 may receive user selections of pre-recorded messages to playback and then transmit the messages to the called party. It can be appreciated that pre-recorded message control component 710 may receive user selections via user commands issued in a manner other than through a graphical menu, such as via codes directly entered by the user without displaying the possible codes and associated messages on display 350.

Pre-recorded messages storage component 720 may function to store the recorded messages at client device 120-1. The messages may be stored in a local memory of client device 120-1, such as main memory 230 or storage device 250. The stored messages may be read by pre-recorded message control component 710 and transmitted to the called party when needed.

It can be appreciated that although a network-based implementation of pre-recorded message playback is shown in FIG. 6 and a client-based implementation is shown in FIG. 7, in some embodiments, these implementations can be combined to create a pre-recorded message playback service that includes both network-based and client-based aspects. For example, the pre-recorded messages could be stored in network 110 while the user interface (e.g., the menu for displaying the possible pre-recorded messages and receiving a selection therefrom) may be handled by a process running locally at client device 120-1.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described above with respect to FIGS. 4A and 4B, the order of the blocks may differ in other implementations consistent with principles of the invention. Moreover, non-dependent blocks may be performed in parallel.

It will be apparent that aspects of the embodiments, as described above, may be implemented in many different forms of software, firmware, and hardware in the implementations illustrated in the figures. The actual software code or specialized control hardware used to implement these embodiments consistent with the principles of the invention is not limiting of the invention. Thus, the operation and behavior of the preferred embodiments of the invention were described without reference to the specific software code—it being understood that software and control hardware may be designed to implement the embodiments based on the description herein.

Further, certain portions of the invention may be implemented as "logic" or as a "component" that performs one or more functions. This logic/component may include hardware, such as an application specific integrated circuit, a field programmable gate array, a processor, or a microprocessor, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
 receiving, by a device and during a telephone call established between a first party and a second party, a command from the first party to transmit a pre-recorded message to the second party,
  the pre-recorded message being an audible message;
 switching, by the device and during the established telephone call, a mode of the device from a first mode to a pre-recorded message mode;
 transmitting, by the device and while the device is in the pre-recorded message mode, the pre-recorded message to the second party based on the command; and transferring, by the device and based on another command from the first party, a device associated with the second party into a voice mail system.

2. The method of claim 1, where the command is received and transmitted from a portable communication device.

3. The method of claim 1, where the device, while in the first mode, is operable to transmit real-time speech of the first party to the second party.

4. The method of claim 1, where the command is received by a network device and where the method further includes:
substituting the pre-recorded message for the command before transmitting the pre-recorded message to the second party.

5. The method of claim 1, where the command includes one or more dual-tone multi-frequency (DTMF) signals.

6. The method of claim 1, where the command is entered by the first party via one or more keypad buttons on a portable communication device.

7. The method of claim 1, where the pre-recorded message is previously recorded by the first party.

8. A non-transitory computer-readable medium storing instructions, the instructions comprising:
one or more instructions, executable by a processor of a device, to cause the processor to:
receive, during a telephone call established between a first party and a second party, a command from the first party to transmit a pre-recorded message to the second party,
the pre-recorded message being an audible message;
switch, during the established telephone call, a mode of the device from a first mode to a pre-recorded message mode;
transmit, while the device is in the pre-recorded message mode, the pre-recorded message to the second party based on the command; and
transfer, based on another command from the first party, a device associated with the second party into a voice mail system.

9. The medium of claim 8, where the command is received and transmitted from a portable communication device.

10. The medium of claim 8, where the first mode is associated with transmitting real-time speech of the first party to the second party.

11. The medium of claim 8, where the command is received by a network device and the instructions further comprise:
one or more instructions to substitute the pre-recorded message for the command before transmitting the pre-recorded message to the second party.

12. The medium of claim 8, where the command includes one or more dual-tone multi-frequency (DTMF) signals.

13. The medium of claim 8, where the command is entered by the first party via one or more keypad buttons on a portable communication device.

14. The medium of claim 8, where the pre-recorded message is previously recorded by the first party.

15. A device comprising:
a processor to:
receive commands from a first communication device, each command identifying a different pre-recorded audible message that is to be forwarded to a second communication device;
store the different pre-recorded audible messages;
switch, during an established telephone call between the first communication device and the second communication device, a mode of the device from a first mode to a pre-recorded message mode;
transmit, while the device is in the pre-recorded message mode, at least one of the different pre-recorded audible messages to the second communication device during a telephone call between the first communication device and the second communication device; and
transfer, based on another command from the first communication device, the second communication device into a voice mail system.

16. The device of claim 15, where the first communication device is a portable telephone.

17. The device of claim 15, where the commands are received as dual-tone multi-frequency (DTMF) signals from the first communication device.

18. The device of claim 15, where at least one of the different pre-recorded audible messages is previously recorded by a user of the first communication device.

19. The device of claim 15, where at least one of the different pre-recorded audible messages is recorded in at least one of a standard voice or a voice of a user of the first communication device.

20. The device of claim 15, where the device, while in the first mode, is operable to transmit real-time speech.

* * * * *